United States Patent [19]

Cubric et al.

[11] Patent Number: 4,854,612
[45] Date of Patent: Aug. 8, 1989

[54] TIRE BUILDING DRUM SHAFT CONNECTION

[75] Inventors: Robert Cubric, Ettelbruck; John K. Roedseth, Bissen, both of Luxembourg

[73] Assignee: The Goodyear Tire & Rubber Company, Akron, Ohio

[21] Appl. No.: 280,361

[22] Filed: Dec. 6, 1988

Related U.S. Application Data

[63] Continuation-in-part of Ser. No. 180,281, Apr. 11, 1988, abandoned.

[51] Int. Cl.⁴ .................... F16L 35/00; F16L 55/00; F16D 1/00; F16B 7/00
[52] U.S. Cl. .................... 285/18; 156/414; 285/39; 285/131; 285/912; 403/316; 403/359
[58] Field of Search ................ 285/131, 309, 912, 18, 285/39; 156/414, 415, 416, 417, 418, 419, 420; 403/348, 316, 317, 359

[56] References Cited

U.S. PATENT DOCUMENTS

| | | | |
|---|---|---|---|
| 1,046,328 | 12/1912 | Preuss | 285/912 X |
| 1,831,956 | 11/1931 | Harrington | 285/912 X |
| 2,583,085 | 1/1952 | Campbell | 425/34.2 |
| 2,907,242 | 10/1959 | Chakroff | 285/912 X |
| 2,936,093 | 5/1960 | Passalqua | 220/298 |
| 3,303,961 | 9/1964 | Witherspoon et al. | 220/293 |
| 3,718,213 | 2/1973 | Hegar | 403/359 X |
| 3,820,600 | 6/1974 | Baugh | 285/131 X |
| 4,013,499 | 3/1977 | Benigni | 156/394.1 |
| 4,040,650 | 8/1977 | Shotbolt | 285/912 X |
| 4,123,306 | 10/1978 | Landry | 156/96 |
| 4,144,114 | 3/1979 | Enders | 156/416 X |
| 4,272,224 | 6/1981 | Kabele | 403/359 X |
| 4,339,055 | 7/1982 | Hutzenlaub | 220/295 |
| 4,402,533 | 9/1983 | Ortloff | 285/912 X |
| 4,434,909 | 3/1984 | Ott | 220/316 |
| 4,498,948 | 2/1985 | Brown | 156/414 X |
| 4,602,654 | 7/1986 | Stehling et al. | 137/296 |

FOREIGN PATENT DOCUMENTS

| | | | |
|---|---|---|---|
| 0704681 | 3/1965 | Canada | 285/912 |
| 0872899 | 4/1953 | Fed. Rep. of Germany | 285/912 |
| 0292025 | 2/1936 | Italy | 285/912 X |
| 0319317 | 3/1957 | Switzerland | 403/348 |
| 1001047 | 8/1965 | United Kingdom | 285/912 |

*Primary Examiner*—Randolph A. Reese
*Assistant Examiner*—Paul M. Frechette
*Attorney, Agent, or Firm*—Frederick K. Lacher; T. P. Lewandowski

[57] ABSTRACT

A shaft connection (10) for rapid mounting and dismounting of a tire building drum by rotating a clamping ring (38) on a sleeve member (20) of a main shaft (14) around an end piece (24) of a drum shaft (12) positioned in the sleeve member (20) to engage or disengage overlapping lugs (42,44) on the clamping ring (38) and end piece (24). Screw members (56,58) connect the clamping ring (38) to a segmental ring (54) in a circumferential slot (68) in the sleeve member (20) for rotating the clamping ring (38). Resilient means (60) are associated with at least some of the screw members (56) and biasing the clamping ring (38) and outer lugs (42) against the inner lugs (44) of the end piece (24) to provide a tight fit between the sleeve member (20) and end piece (24). A central shaft (104) has a sliding connection 112' between a retractable inboard section (116) with a sliding connection (112') with an outboard section (114) for engagement after mounting of the sleeve member (20) over the end piece (24).

21 Claims, 4 Drawing Sheets

TIRE BUILDING DRUM SHAFT CONNECTION

This application is a continuation-in-part of copending U.S. application Ser. No 180,281, filed Apr. 11, 1988, now abandoned, and relates generally to a tire building machine and especially to a tire building drum mounting system wherein different size drums are mounted on a main shaft of the machine.

In order to meet the requirements for precision tires, the drums must be mounted coaxially with the main shaft and be held tightly in place. The mounting system must also have the structural capacity to withstand unusually high loads which may be imposed on the drum by the operator or a malfunction of the building apparatus. It is important that the time required to change drums be kept to a minimum so that the tire building machine may be in production with as little downtime as possible. Fluid passages such as air lines in the connected shafts must be connected and the mounting system must provide for aligning the connecting ends of the passages and sealing the connections.

Heretofore, the main shaft and drum shaft have had flanges at the ends which were bolted together to connect the shafts. The fluid passage connections were sealed with individual O-rings. The changing of the drum consumed a considerable amount of time and required the services of a skilled mechanic. The sealing of the several fluid passages also required special care and skill in assembly.

In accordance with an aspect of the invention, there is provided a shaft connection between two coaxial shafts comprising a sleeve member for mounting on an end of one of the shafts, an end piece for mounting on an end of the other of the shafts, the sleeve member having a generally conical inside surface, the end piece having a generally conical outside surface for insertion into engagement with the inside surface of the sleeve member, a clamping ring mounted on the sleeve member for limited axial movement and rotation relative to the sleeve member, the clamping ring having at least two circumferentially spaced outer lugs extending inwardly toward the end piece, the end piece having at least two circumferentially spaced inner lugs extending outwardly toward the sleeve member for overlapping engagement and disengagement with the outer lugs upon rotation of the clamping ring, a segmental ring mounted on the sleeve member for relative rotation at a fixed axial position of the sleeve member, connecting members extending between the clamping ring and the segmental ring for segmental the clamping ring in response to rotation of the segmental ring, resilient means for biasing the clamping ring toward the segmental ring so that upon engagement of the outer lugs with the inner lugs the end piece will be urged into the sleeve member to provide a tight fit between the conical inside surface of the sleeve member and the conical outside surface of the end piece.

In accordance with another aspect of the invention there is provided a shaft connection between two coaxial shafts comprising a sleeve member for mounting on an end of one of the shafts, an end piece for mounting on an end of the other of the shafts, the sleeve member having a generally conical inside surface, the end piece having a generally conical outside surface for insertion into engagement with the inside surface of the sleeve member, a clamping ring mounted on the sleeve member for limited axial movement and rotation relative to the sleeve member, the clamping ring having at least two circumferentially spaced outer lugs extending inwardly toward the end piece, the end piece having at least two circumferentially spaced inner lugs extending outwardly toward the sleeve member for overlapping engagement and disengagement with the outer lugs upon rotation of the clamping ring, the coaxial shafts including a main shaft rotatably mounted in a stationary support at an inboard position and a drum shaft supported by the main shaft, a central shaft positioned in a central bore extending through the center of the main shaft and the drum shaft, the central shaft having an inboard section rotatably mounted in the main shaft and an outboard section rotatably mounted in the drum shaft, a spline bushing mounted on the inboard section of the central shaft and a splined shaft portion mounted on the outboard section of the central shaft for engagement upon mounting of the sleeve member of one of the coaxial shafts over the end piece of the other of the coaxial shafts, the inboard section of the central shaft being slidably mounted for axial movement in the main shaft and means for moving the inboard section axially to a retracted position during mounting of the sleeve member over the end piece and to an extended position with the spline bushing of the inboard section in engagement with the splined shaft portion of the outboard section of the central shaft after mounting of the sleeve member over the end piece.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
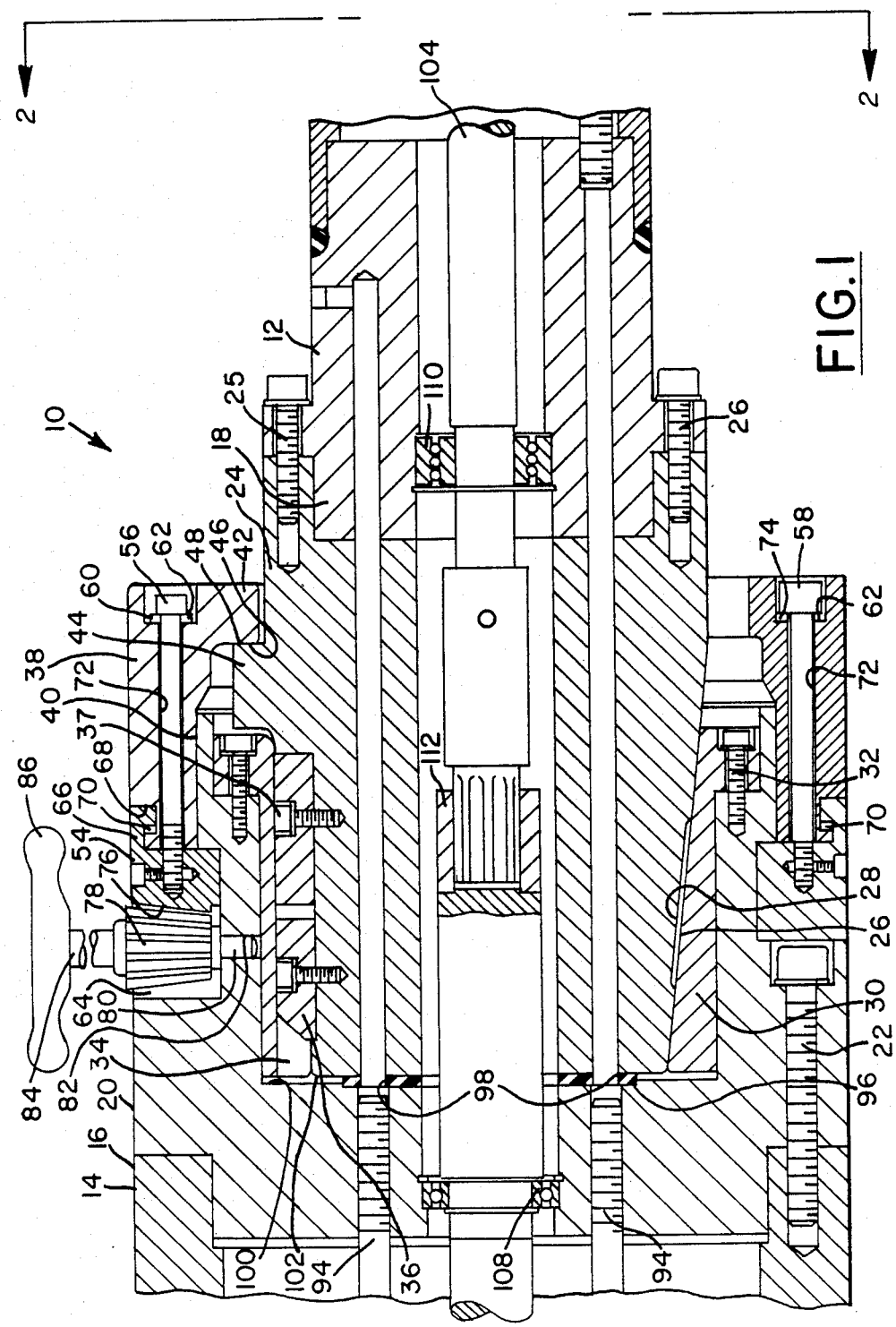
FIG. 1 is a sectional view of the shaft connection embodying the invention mounted between the drum shaft and the main shaft taken along line 1—1 in FIG. 2 with parts being broken away.
Figure 2:
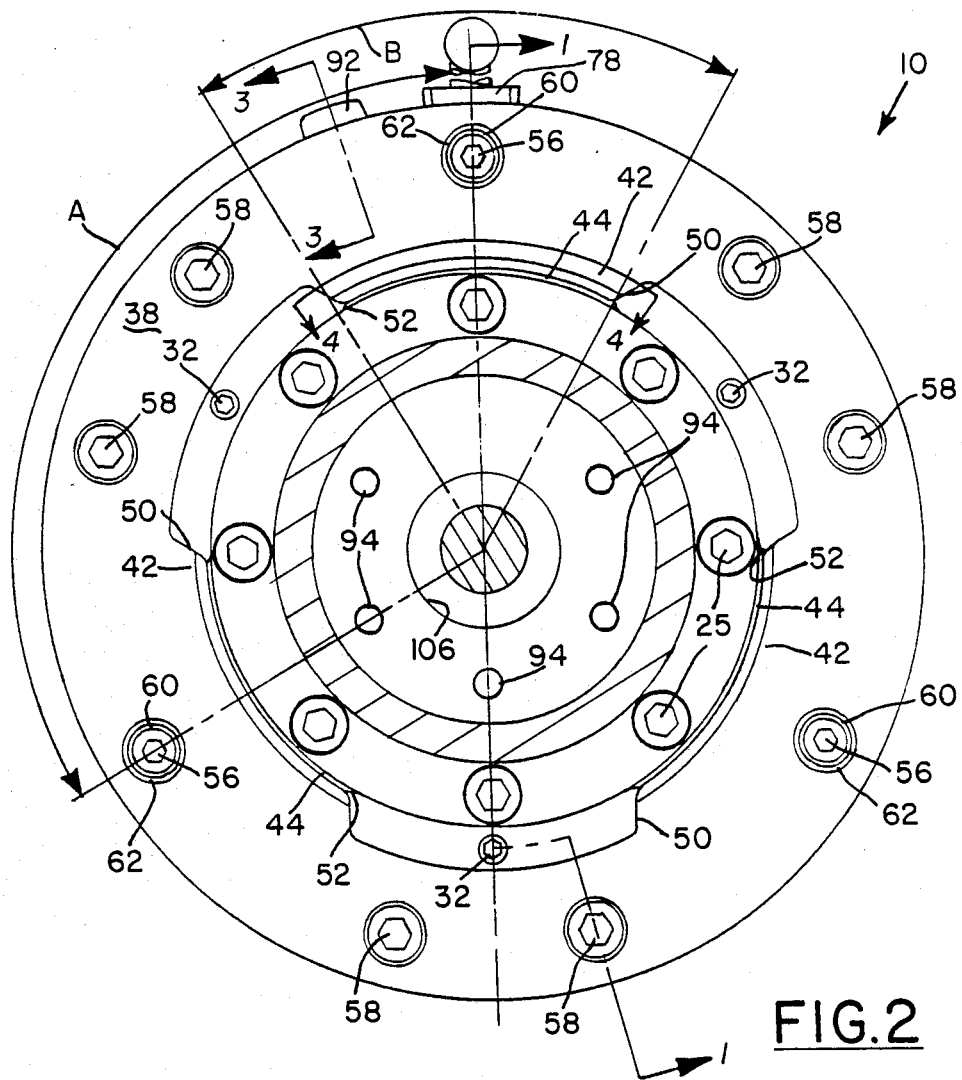
FIG. 2 is an end view taken along line 2—2 in FIG. 1.

Referring FIGS. 1 and 2, a shaft connection 10 is shown for connecting a drum shaft 12 for a tire building machine drum to a main shaft 14 which may be rotatably mounted in a housing for supporting the tire building machine drum. The drum shaft 12 and main shaft 14 are coaxial and are positioned with an end portion 16 of the main shaft spaced from an end portion 18 of the drum shaft. A sleeve member 20, which may be cylindrical and have mating surfaces for mounting on the end portion 16 of the main shaft 14, is fastened to the main shaft by suitable fasteners such as screws 22. An end piece 24 for mounting inside the sleeve member 20 is fitted over the end portion 18 of the drum shaft 12 and is fastened to the drum shaft by suitable fasteners such as screws 25.

The end piece 24 has a generally conical outside surface 26 for engagement with a generally conical inside surface 28 of the sleeve member 20. The sleeve member 20 may have a replaceable liner 30 mounted on the sleeve member as by suitable fasteners such as screws 32. The replaceable liner 30 may be removed and replaced with a new liner when the conical inside surface 28 has worn to a point where the shaft connection 10 is not satisfactory. The liner 30 may also have a keyway 34 for receiving a key 36 which may be mounted on the end piece 24 as by screws 37.

Figure 4:
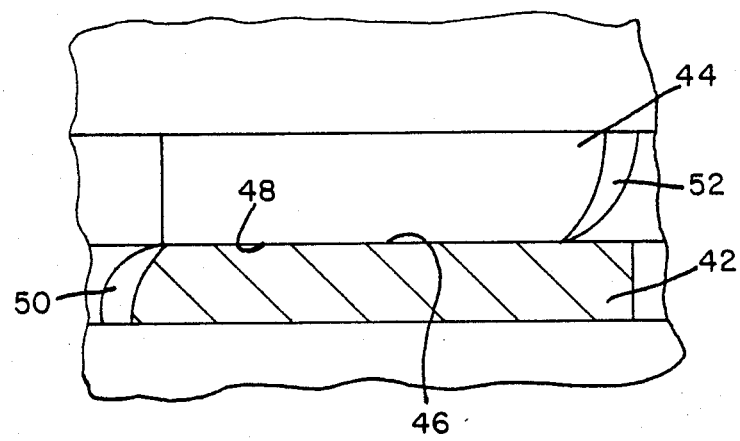
FIG. 4 is an enlarged fragmentary view taken along line 4—4 in FIG. 2 showing the bearing surfaces at the leading edges of the lugs.

A clamping ring 38, which is generally cylindrical, is mounted on a generally cylindrical outer surface 40 of the sleeve member 20 and has at least two outer lugs 42 at circumferentially spaced positions around the clamping ring with the lugs extending inwardly toward the end piece 24. In this embodiment, there are three outer lugs 42 with the center of each lug being at an angle A of about 120 degrees from the center of adjacent outer lugs. Corresponding to the outer lugs 42 are inner lugs 44 extending radially outward from the end piece 24 and spaced circumferentially around the end piece for overlapping engagement with the outer lugs 42. The circumferential length of each of the inner lugs 44 extends over an angle B of about 60 degrees which is the same as the circumferential length of each of the outer lugs 42. Referring to FIG. 4, an enlarged view of one of the outer lugs 42 and one of the inner lugs 44 in overlapping engagement is shown. A bearing surface 46 of the outer lug 42 is in overlapping engagement with a bearing surface 48 of the inner lug 44. A leading edge 50 of the outer lug 42 engages a leading edge 52 of the inner lug 44 when the clamping ring 38 is rotated from a disengaged position to the engaged position shown in FIG. 2. The bearing surface 46 of the outer lug 42 is suitably offset and contoured at the leading edge 50 and the bearing surface 48 of the inner lug 44 is suitably offset and contoured at the leading edge to facilitate a smooth overlapping engagement of the lugs between the disengaged circumferential position and the engaged circumferential position.

Figure 3:
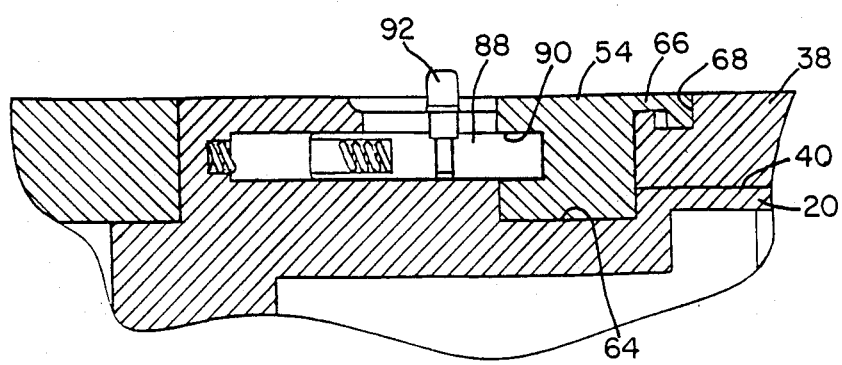
FIG. 3 is an enlarged fragmentary section of the sliding bolt mechanism taken along line 3—3 in FIG. 2.

As shown in FIGS. 1 and 3, the clamping ring 38 is fastened to a rotating ring such as segmental ring 54 by connecting members such as spring-mounted screws 56 and intermediate screws 58 disposed at circumferentially spaced positions around the segmental ring. Resilient means such as spring members 60 are interposed between the screw head of each of the spring-mounted screws 56 and a bearing surface 62 of each of the sockets in the clamping ring 38. In the embodiment shown, the spring members 60 are Bellville spring washers; however, washers of resilient material such as rubber or polyurethane may also be used as spring members to provide the desired resiliency for biasing the clamping ring 38 toward the rotating segmental ring 54 providing a tight fit between the conical outside surface 26 of the end piece 24 and the conical inside surface 28 of the sleeve member 20.

The segmental ring 54 has at least two segments to facilitate installation in a circumferential slot 64 in the outer surface 40 of the sleeve member 20. The segments may be fastened together after installation in a manner permitting rotation of the ring 54 in the slot 64. The segmental ring 54 has a flange 66 overlapping the edge of the clamping ring 38 and extending radially inward into a slot 68 in the clamping ring. The flange 66 has a width less than the width of the slot 68 to provide a clearance space 70 for relative axial movement of the clamping ring 38 and segmental ring 54 resulting from deflection of the spring members 60.

Preferably the spring-mounted screws 56 are positioned in a generally central location relative to each of the outer lugs 42 and the intermediate screws 58 are evenly spaced between the spring-mounted screws. Both the spring-mounted screws 56 and intermediate screws 58 are mounted in openings such as holes 72 extending axially through the clamping ring 38 permitting relative axial movement of the segmental ring 54 and clamping ring but preventing relative rotation of the clamping ring and segmental ring. As shown in FIG. 1, each of the screw heads of the intermediate screws 58 is spaced from the bearing surface 62 of the clamping ring 38 providing a clearance space 74.

Suitable means for rotating the segmental ring 54 a predetermined angular distance such as angle B of 60 degrees may be provided and, in this embodiment, a rack portion 76 is provided along an edge of the segmental ring 54 which is spaced from an opposing edge of the slot 64. A pinion member 78 has a stub shaft 80 for insertion in a hole 82 in the base of the slot 64 upon insertion of the pinion member into the slot and in engagement with the rack 76. A shaft 84 and handle 86 are connected to the pinion member 78 to facilitate rotating of the pinion member causing the segmental ring 54 to rotate and move the clamping ring 38 and outer lugs 42 into and out of overlapping engagement with the inner lugs 44.

As shown in FIGS. 2 and 3, locking means such as a spring-loaded sliding bolt 88 may be mounted in the sleeve member 20 for insertion into an indentation 90 in the segmental ring 54 when the ring is turned through the angle B so that the outer lugs 42 overlap the inner lugs 44. When it is desired to rotate the segmental ring 54 in the opposite direction to disengage the outer lugs 42 from the inner lugs 44, a knob 92 connected to the sliding bolt 88 may be pushed to retract the bolt from the indentation 90. The pinion member 78 may be inserted in the slot 64 in engagement with the rack 76 and turned to move the outer lugs 42 out of engagement with the inner lugs 44.

As shown in FIG. 1, fluid passages 94 may be provided in the sleeve member 20 and end piece 24 which are in communication with fluid passages in the main shaft 14 and drum shaft 12. These passages 94 are maintained in alignment by the key 36 and keyway 34 of the end piece 24 and sleeve member 20, respectively. A unitary seal member such as gasket 96 having openings 98 in alignment with the fluid passages 94 is positioned between a recessed inner face 100 of the sleeve member 20 and a projecting outer face 102 of the end piece 24 to seal the fluid passages 94. The thickness of the gasket 96 is greater than the closed distance between the recessed inner face 100 and projecting outer face 102 with the end piece 24 held tightly in the sleeve member 20 by the action of the spring members 60. The gasket 96 may be adhered to the recessed inner face 100 of the sleeve member 20 or the projecting outer face 102 of the end piece 24 so that upon movement of the recessed inner face toward the projecting outer face, the openings 98 in the gasket 96 will be in the desired alignment.

An auxiliary central shaft 104 may be positioned in a central bore 106 extending through the center of the drum shaft 12, end piece 24, sleeve member 20 and main shaft 14. The shaft 104 may be supported in the sleeve member 20 by bearings 108 and in the drum shaft 12 by bearings 110. The shaft 104 may be provided with a sliding connection 112 which may contain splines for transmitting the rotation of the central shaft 104.

With the shaft connection 10 shown in the drawings and described hereinabove different size drums may each have the end piece 24 mounted on the drum shaft 12 of that drum for mounting in the sleeve member 20. Then when it is desired to change drums, all that is necessary is to insert the pinion 78 in the slot 64, retract the sliding bolt 88 and turn the handle 86 to rotate the segmental ring 54 and the clamping ring 38 to disengage the outer lugs 42 from the inner lugs 44. The drum shaft 12 and end piece 24 of that drum may then be pulled out of the sleeve member 20 and the end piece of a new drum inserted in the sleeve member. The clamping ring 38 may then be rotated to place the outer lugs 42 in overlapping engagement with the inner lugs 44 with the sliding bolt 88 inserted in the indentation 90. The pinion 78 may then be pulled out of the slot 64 and the tire building machine is ready to operate with the new drum.

The structural integrity of the shaft connection 10 is maintained while at the same time the spring pressure by the spring members 60 is limited for ease of turning the clamping ring 38 with the outer lugs 42 pressing against the inner lugs 44 during the turning operation. In the event of unusually high loads being imposed on the drum by the operator or a malfunction of the building apparatus, the intermediate screws 58 and the flange 66 on the segmental ring 54 are brought into engagement for preventing movement of the end piece 24 out of the sleeve member 20 after the clamping ring 38 has moved a distance equal to the clearance spaces 70 and 74. It can, therefore, be seen that the shaft connection 10 described and shown herein provides for a quick disconnection and connection of the drum shaft 12 from the main shaft 14 while at the same time maintaining the shafts in coaxial alignment and preventing inadvertent disconnection.

Figure 5:
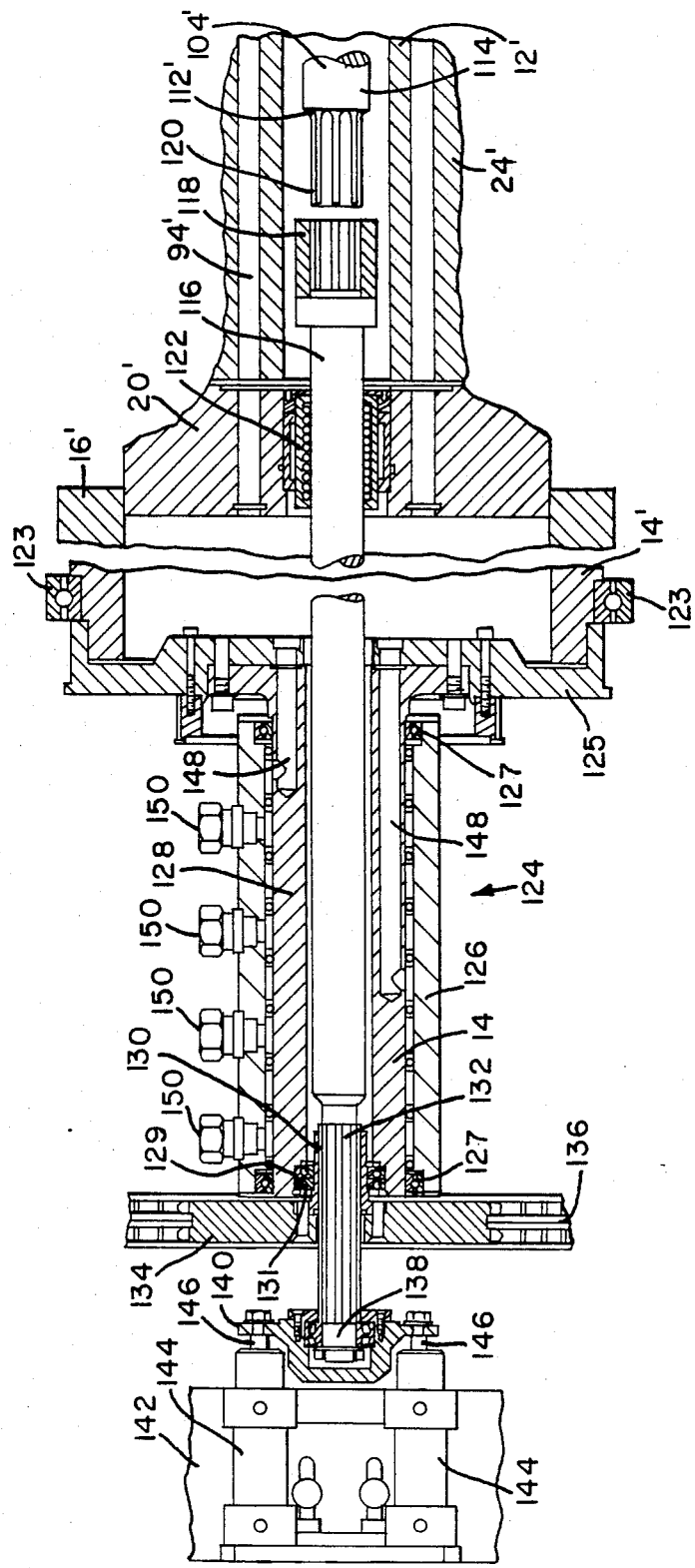
FIG. 5 is a sectional view like FIG. 1 with parts broken away showing a modification of the invention with the inboard section of the central shaft in the retracted position.

Referring to FIG. 5, a modification is shown which provides for an improved central shaft connection. In describing this modification, those parts which are identical with the parts described and shown in FIGS. 1 through 4 will be identified by the same number with a prime mark.

The central shaft 104' has an outboard section 114 and an inboard section 116 connected by the sliding connection 112' which includes a spline bushing 118 mounted on the inboard section 116 and a splined shaft portion 120 mounted on the outboard section. In FIG. 5 the spline bushing 118 is shown in the retracted position of the inboard section 116. Axial movement of the inboard section 116 is facilitated by the ball bushing bearing 122 mounted in the sleeve member 20' of the drum shaft 12'. The sleeve portion 16' of the main shaft 14' is rotatably supported in bearings 123 mounted in a suitable housing (not shown).

A main shaft rotary joint assembly 124 is mounted on an end plate 125 of the main shaft 14' and has a housing 126 rotatably supported on outer bearings 127 mounted on a rotary joint shaft 128. An inner bearing 129 is mounted between a sprocket spline bushing 130 and an inner surface 131 of the rotary joint shaft 128 for rotatably engaging the inboard section 116 of the central shaft 104'. A splined portion 132 of the inboard section 116 is slidably mounted in the sprocket spline bushing 130 which is connected to a sprocket 134 for driving the central shaft 104' as by a chain 136 driven by a motor (not shown).

An inboard end 138 of the central shaft 104' is rotatably mounted in a bearing housing 140 connected to a stationary supporting structure such as beam 142 by air cylinders 144 mounted on the beam and pistons 146 extending from the cylinders to the bearing housing 140. The rotary joint shaft 128 may include fluid passages 148 in communication with ports 150 in the main shaft rotary joint housing 126 and with the fluid passages 94' of the drum shaft 2', sleeve member 20' and end piece 24'. These ports 150 are in communication with a suitable source of fluid under pressure.

In operation of the embodiment shown in FIG. 5, the inboard section 116 of the central shaft 104' is retracted to the position shown by actuating the double-acting air cylinders 144 to move the piston 146 and bearing housing 140 to the left. The drum shaft 12' and the outboard section 114 of the central shaft 104' may then be connected to the main shaft 14' without having to seat the splined shaft portion 120 of the central shaft in the spline bushing 118 as the end piece 24' is mounted inside the sleeve member 20'. The seating of the splined shaft portion 120 in the spline bushing 118 is then accomplished by actuating the cylinders 144 to move the pistons 146 and bearing housing 140 to the right as shown in FIG. 5. The spline bushing 118 is then moved to the right into engagement with the splined shaft portion 120. At the same time, the sprocket 134 is slowly rotated by the chain 136 until the splines and the slots for the splines are in alignment. Then the pressure exerted by the cylinders 144 will cause the outboard section 114 of the central shaft 104' to move to the right and the spline bushing 118 will move over the splined shaft portion 120 of the central shaft until the splined shaft portion is fully seated in the spline bushing. This operation can be done in a short time and with a minimum of labor.

While certain representative embodiments and details have been shown for the purpose of illustrating the invention, it will be apparent to those skilled in the art that various changes and modifications may be made therein without departing from the spirit or scope of the invention.

What is claimed is:

1. A shaft connection between two coaxial shafts comprising a sleeve member for mounting on an end of one of said shafts, an end piece for mounting on an end of the other of said shafts, said sleeve member having a generally conical inside surface, said end piece having a generally conical outside surface for insertion into engagement with said inside surface of said sleeve member, a clamping ring mounted on said sleeve member for limited axial movement and rotation relative to said sleeve member, said clamping ring having at least two circumferentially spaced outer lugs extending inwardly toward said end piece, said end piece having at least two circumferentially spaced inner lugs extending outwardly toward said sleeve member for overlapping engagement and disengagement with said outer lugs upon rotation of said clamping ring, a segmental ring mounted on said sleeve member for relative rotation at a fixed axial position of said sleeve member, connecting members extending between said clamping ring and said segmental ring for rotating said clamping ring in response to rotation of said segmental ring, resilient means for biasing said clamping ring toward said segmental ring so that upon engagement of said outer lugs with said inner lugs said end piece will be urged into said sleeve member to provide a tight fit between said conical inside surface of said sleeve member and said conical outside surface of said end piece.

2. The shaft connection of claim 1 wherein said segmental ring is positioned in a first circumferential slot in the surface of said sleeve member and said segmental ring has at least two segments to facilitate installation in said first circumferential slot.

3. The shaft connection of claim 2 wherein said clamping ring has a second circumferential slot in an outer surface thereof and said segmental ring has a flange overlapping said clamping ring and positioned in said second circumferential slot.

4. The shaft connection of claim 3 wherein said flange of said segmental ring has a width in an axial direction less than the width of said second circumferential slot in said clamping ring to provide clearance for relative axial movement of said clamping ring and said segmental ring.

5. The shaft connection of claim 1 wherein said connecting members comprise a plurality of screw members positioned at circumferentially spaced locations around said sleeve member and extending between said segmental ring and said clamping ring, and said resilient means includes spring members in engagement with at least three of said screw members for urging said clamping ring toward said segmental ring.

6. The shaft connection of claim 5 wherein each of said screw members is fastened to said segmental ring and extends through a hole in said clamping ring permitting sliding movement of said clamping ring on said screw members and resisting relative circumferential movement of said clamping ring and said segmental ring.

7. The shaft connection of claim 6 wherein said clamping ring has at least three outer lugs and each of said spring members is in engagement with one of said screw members positioned adjacent each of said outer lugs and the other of said screw members being positioned at circumferentially spaced positions between said screw members engaging said spring members.

8. The shaft connection of claim 1 including means for turning said segmental ring a predetermined angular distance to move said outer lugs into and out of overlapping engagement with said inner lugs.

9. The shaft connection of claim 8 wherein said means for turning said segmental ring includes a rack portion of a predetermined length disposed along one edge of said segmental ring and a pinion engageable with said rack portion and having a stub shaft for inserting in a hole in said sleeve member.

10. The shaft connection of claim 9 wherein said pinion member is removable and has a handle for turning said pinion member.

11. The shaft connection of claim 10 wherein said segmental ring has at least two segments mounted for rotation in a circumferential groove in the surface of said sleeve member, said one edge of said segmental ring being recessed at said rack portion providing a cavity for insertion of said pinion.

12. The shaft connection of claim 1 including sliding bolt locking means mounted on said sleeve member and positioned for engagement with said segmental ring after turning of said clamping ring to a position with said outer lugs in overlapping engagement with said inner lugs.

13. The shaft connection of claim 1 wherein said shafts have fluid passages in communication with fluid passages in said end piece and said sleeve member, said sleeve member having a recessed inner face with openings for said fluid passages, said end piece having a projecting outer face with openings for said fluid passages, a unitary seal member having openings in alignment with said openings in said recessed inner face and said projecting outer face and said seal member being compressible to prevent leakage from said fluid passages in the space between said recessed inner face and said projecting outer face of said sleeve member and said end piece.

14. The shaft connection of claim 13 wherein said end piece and said sleeve member are connected by key means to align the openings in said projecting outer face and said recessed inner face and to prevent relative rotation of said shafts.

15. The shaft connection of claim 1 wherein said inner lugs and said outer lugs each have bearing surfaces for overlapping engagement, said inner lugs and said outer lugs each having leading edges for engagement upon rotation of said clamping ring and said bearing surface of each of said lugs being offset at said leading edge to guide said lugs into overlapping engagement upon rotation of said clamping ring.

16. The shaft connection of claim 1 wherein a central shaft is positioned in a central bore extending through the center of said coaxial shafts, said central shaft having an inboard section rotatably mounted in one of said coaxial shafts and an outboard section rotatably mounted in the other of said shafts, a sliding connection between said inboard section and said outboard section for engagement upon mounting of said sleeve member of one of said coaxial shafts over said end piece of the other of said coaxial shafts.

17. The shaft connection of claim 16 wherein said sliding connection includes a spline bushing mounted on said inboard section of said central shaft and a splined shaft portion on said outboard section of said central shaft.

18. The shaft connection of claim 17 wherein one of said coaxial shafts is a main shaft rotatably mounted in a stationary support at an inboard position and the other of said coaxial shafts is a drum shaft supported by said main shaft at an outboard position, said inboard section of said central shaft being slidably mounted for axial movement in said main shaft and means for moving said inboard section axially to a retracted position during mounting of said sleeve member over said end piece and to an extended position with said spline bushing of said inboard section in engagement with said splined shaft portion of said outboard section of said central shaft after mounting of said sleeve member over said end piece.

19. A shaft connection between two coaxial shafts comprising a sleeve member for mounting on an end of one of said shafts, an end piece for mounting on an end of the other of said shafts, said sleeve member having a generally conical inside surface, said end piece having a generally conical outside surface for insertion into engagement with said inside surface of said sleeve member, a clamping ring mounted on said sleeve member for limited axial movement and rotation relative to said sleeve member, said clamping ring having at least two circumferentially spaced outer lugs extending inwardly toward said end piece, said end piece having at least two circumferentially spaced inner lugs extending outwardly toward said sleeve member for overlapping engagement and disengagement with said outer lugs upon rotation of said clamping ring, said coaxial shafts including a main shaft rotatably mounted in a stationary support at an inboard position and a drum shaft supported by said main shaft, a central shaft positioned in a central bore extending through the center of said main shaft and said drum shaft, said central shaft having an inboard section rotatably mounted in said main shaft and an outboard section rotatably mounted in said drum shaft, a spline bushing mounted on said inboard section of said central shaft and a splined shaft portion mounted on said outboard section of said central shaft for engagement upon mounting of said sleeve member of one of said coaxial shafts over said end piece of the other of said coaxial shafts, said inboard section of said central shaft being slidably mounted for axial movement in said main shaft and means for moving said inboard section axially to a retracted position during mounting of said sleeve member over said end piece and to an extended position with said spline bushing of said inboard section in engagement with said splined shaft portion of said outboard section of said central shaft after mounting of said sleeve member over said end piece.

20. The shaft connection of claim 19 wherein said means for moving said inboard section axially includes a bearing housing rotatably connected to an inboard end of said inboard section of said central shaft, said bearing housing containing bearing means permitting rotation but limiting axial movement of said central shaft relative to said bearing housing and a piston cylinder assembly between said bearing housing and a supporting beam member for moving said central shaft from a retracted position to an extended position for engagement of said splined shaft portion with said spline bushing.

21. The shaft connection of claim 20 wherein said inboard section of said central shaft is rotatably supported by bearing means, and said bearing means includes an inboard spline bushing connected to a drive sprocket and said central shaft having a splined portion slidably supported in said spline bushing for axial movement of said central shaft while in driving engagement with said drive sprocket.

* * * * *